US008437314B2

(12) United States Patent
Vlantis et al.

(10) Patent No.: US 8,437,314 B2
(45) Date of Patent: May 7, 2013

(54) RADIO FREQUENCY ARCHITECTURE FOR SPECTRUM ACCESS NETWORKS

(75) Inventors: George A. Vlantis, Sunnyvale, CA (US); Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 827 days.

(21) Appl. No.: 12/035,353

(22) Filed: Feb. 21, 2008

(65) Prior Publication Data

US 2008/0207204 A1  Aug. 28, 2008

Related U.S. Application Data

(60) Provisional application No. 60/891,122, filed on Feb. 22, 2007, provisional application No. 60/930,077, filed on May 14, 2007.

(51) Int. Cl.
| | |
|---|---|
| H04L 12/50 | (2006.01) |
| H04L 5/16 | (2006.01) |
| H04L 27/12 | (2006.01) |
| H04Q 11/00 | (2006.01) |
| H04W 4/00 | (2009.01) |
| H04B 1/38 | (2006.01) |
| H04B 1/40 | (2006.01) |
| H04B 1/18 | (2006.01) |
| H04B 1/16 | (2006.01) |
| H04B 1/26 | (2006.01) |
| H04B 15/00 | (2006.01) |
| H04N 7/12 | (2006.01) |
| H04N 11/02 | (2006.01) |
| H04N 11/04 | (2006.01) |
| H03C 3/00 | (2006.01) |
| H03K 7/06 | (2006.01) |
| H04M 1/00 | (2006.01) |

(52) U.S. Cl.
USPC ...... 370/334; 370/338; 375/219; 375/240.06; 375/307; 455/87; 455/193.1; 455/209; 455/315; 455/562.1

(58) Field of Classification Search ........... 370/334, 370/338; 375/219, 240.06, 307; 455/87, 455/193.1, 209, 315, 562.1
See application file for complete search history.

(56) References Cited

U.S. PATENT DOCUMENTS

| | | | |
|---|---|---|---|
| 5,574,413 A | * | 11/1996 | Ruelke ..................... 333/174 |
| 5,625,626 A | | 4/1997 | Umekita |
| 5,805,633 A | | 9/1998 | Uddenfeldt |
| 5,862,142 A | | 1/1999 | Takiyasu et al. |
| 6,275,518 B1 | | 8/2001 | Takahashi et al. |
| 6,496,498 B1 | | 12/2002 | Kockmann et al. |

(Continued)

OTHER PUBLICATIONS

U.S. Appl. No. 60/729,036, filed Oct. 2005, Woo et al.*

(Continued)

*Primary Examiner* — Alpus H Hsu
*Assistant Examiner* — Yee Lam
(74) *Attorney, Agent, or Firm* — Hogan Lovells US LLP

(57) ABSTRACT

Radio frequency (RF) architectures for spectrum access networks are provided. Embodiments of the invention generally provide a radio frequency (RF) architecture for customer premise equipment (CPE) for use in, for example, IEEE 802.22 wireless regional area networks (WRANs). In some embodiments, the CPE RF architecture includes two receive chains with a directional antenna and an omni-directional antenna, respectively. The CPE RF architecture facilitates opportunistic out-of-band spectrum sensing and WRAN signal receiving that are performed in parallel with data transmission.

13 Claims, 2 Drawing Sheets

U.S. PATENT DOCUMENTS

| | | | |
|---|---|---|---|
| 6,744,743 B2 | 6/2004 | Walton et al. | |
| 6,763,230 B2 * | 7/2004 | Cheng | 455/323 |
| 6,888,819 B1 | 5/2005 | Mushkin et al. | |
| 7,002,927 B2 | 2/2006 | Guruprasad | |
| 7,024,165 B2 * | 4/2006 | Stepp et al. | 455/81 |
| 7,171,160 B2 | 1/2007 | Chuah et al. | |
| 7,280,836 B2 | 10/2007 | Fuccello et al. | |
| 7,508,781 B2 | 3/2009 | Liu et al. | |
| 7,609,641 B2 | 10/2009 | Strutt et al. | |
| 7,701,910 B2 | 4/2010 | Yoon et al. | |
| 7,710,919 B2 * | 5/2010 | Woo et al. | 370/329 |
| 7,729,696 B2 | 6/2010 | Harris et al. | |
| 7,813,326 B1 | 10/2010 | Kelm et al. | |
| 7,948,930 B2 | 5/2011 | Rhee | |
| 7,983,703 B2 | 7/2011 | Chu | |
| 2002/0009067 A1 | 1/2002 | Sachs et al. | |
| 2002/0052206 A1 | 5/2002 | Longoni | |
| 2002/0062388 A1 | 5/2002 | Ogier et al. | |
| 2003/0013451 A1 | 1/2003 | Walton | |
| 2003/0033394 A1 | 2/2003 | Stine | |
| 2003/0117966 A1 | 6/2003 | Chen | |
| 2004/0072565 A1 | 4/2004 | Nobukiyo et al. | |
| 2004/0142699 A1 | 7/2004 | Jollota et al. | |
| 2004/0266351 A1 | 12/2004 | Chuah et al. | |
| 2004/0266376 A1 * | 12/2004 | Cowley et al. | 455/150.1 |
| 2005/0157676 A1 | 7/2005 | Kwak et al. | |
| 2005/0226201 A1 | 10/2005 | McMillin | |
| 2005/0239497 A1 | 10/2005 | Bahl et al. | |
| 2005/0245199 A1 * | 11/2005 | Batra et al. | 455/73 |
| 2005/0265283 A1 | 12/2005 | Qi et al. | |
| 2006/0013177 A1 | 1/2006 | Saito | |
| 2006/0142021 A1 | 6/2006 | Mueckenheim et al. | |
| 2006/0199562 A1 * | 9/2006 | Taylor | 455/333 |
| 2007/0091998 A1 * | 4/2007 | Woo et al. | 375/240.02 |
| 2007/0111734 A1 | 5/2007 | Beppu et al. | |
| 2007/0117517 A1 | 5/2007 | Hui et al. | |
| 2007/0223419 A1 | 9/2007 | Ji et al. | |
| 2007/0243892 A1 | 10/2007 | Mikami et al. | |
| 2007/0248067 A1 | 10/2007 | Banerjea et al. | |
| 2008/0159258 A1 | 7/2008 | Ji et al. | |
| 2008/0165680 A1 * | 7/2008 | Chang | 370/230 |
| 2008/0205352 A1 | 8/2008 | Chu et al. | |
| 2009/0003291 A1 | 1/2009 | Chu et al. | |

OTHER PUBLICATIONS

U.S. Appl. No. 60/883,810, filed Jul. 2007, Chang, Soo-Young.*
Chang, Soo-Young, "Waveform Modulated WRAN System", IEEE 802.22-05/0107r3, Jan. 16, 2006.*
Chang, Soo-Young, "Analysis of Proposed Sensing Schemes", IEEE 802.22-06/0032r0, Mar. 6, 2006.*
IEEE LAN MAN Standards Committee, Draft Amendment to IEEE Standard for Local and metropolitan area networks Part 16: Air Interface for Fixed and Mobile Broadband Wireless Access Systems Improved Coexistence Mechanisms for License-Exempt Operation, draft, IEEE P802.16h/D1, New York, New York, Oct. 2006, pp. 201.
Freedman, Slave Hierarchy for Better Usage of Regions not Interfered by the Master Subframe, report, IEEE C802.16h-06/102, Broadband Wireless Access Working Group; Nov. 8, 2006, pp. 6.
Chu et al., 6-Address Scheme for TGs Mesh, slides, IEEE 802.11-06/841r5, San Jose, CA, Sep. 19, 2006, pp. 28.
Iwata et al., report, Scalable Routing Strategies for Ad hoc Wireless Networks, Los Angeles, CA, pp. 26.
Hong et al., Scalable Routing Protocols for Mobile Ad Hoc Networks, report, IEEE Jul./Aug. 2002, pp. 5.
Pei et al., Fisheye State Routing: A Routing Scheme for Ad Hoc Wireless Networks, report, IEEE 2000, pp. 5.
Yang et al., Fisheye Zone Routing Protocol for Mobile Ad Hoc Networks, report, Taiwan R.O.C., IEEE 2004, pp. 6.

* cited by examiner

RADIO FREQUENCY ARCHITECTURE FOR SPECTRUM ACCESS NETWORKS

The present application claims the benefit of U.S. Provisional Patent Application No. 60/891,122 filed on Feb. 22, 2007, and U.S. Provisional Patent Application No. 60/930,077 filed on May 14, 2007, which are hereby incorporated by reference in their entirety for all purposes as if fully set forth herein.

BACKGROUND OF THE INVENTION

1. Field of the Invention

The invention relates generally to communication systems and in particular to radio frequency (RF) architectures for spectrum access networks.

2. Discussion of the Related Art

The Institute of Electrical and Electronics Engineers (IEEE) formed the IEEE 802.22 Working Group to develop protocols for an interoperable air interface for use in spectrums allocated to TV broadcast service and to provide wireless services such as broadband access a point-to-multipoint wireless regional area network (WRAN). IEEE 802.22 specifies that a network should operate in a point-to-multipoint basis (P2MP). A system should be formed by base stations (BSs) and customer premise equipment (CPE). The CPEs are attached to the BSs via wireless links in a specified frequency range. Each BS controls the medium access for all CPEs attached to it.

WRAN BSs are capable of performing distributed sensing. In other words, CPEs sense the spectrum and send periodic reports to a base station informing it about what they sense. The BS, with the information gathered, will evaluate if it is necessary to implement a change in the utilized channel or, on the contrary, remain in the same channel to transmit and receive.

There is therefore a need for RF architectures for CPE for use in, for example, IEEE 802.22 WRANs.

SUMMARY OF THE INVENTION

Accordingly, the invention is directed to RF architecture for spectrum access networks that substantially obviates one or more of the problems due to limitations and disadvantages of the related art.

An advantage of the invention is to provide a system capable of receiving outside data from another system, e.g., other BSs and CPEs not subscribed, while transmission/reception on another directional antenna can take place on a BS to which the CPE has subscribed.

Additional features and advantages of the invention will be set forth in the description which follows and, in part, will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the invention as embodied and broadly described, an out-of-band sensing circuit includes a sensing antenna coupled to a pre-selective filter. A low noise amplifier is coupled to the pre-selective filter and a mixer is coupled to the low noise amplifier. A local oscillator and a channel filter are coupled to the mixer. A WRAN synchronization module and a sensing scheme module is coupled to the channel filter.

In another aspect of the invention, a WRAN signal receiving circuit includes an antenna coupled to a RF switch. A pre-selective filter is coupled to the RF switch and a low noise amplifier is coupled to the pre-selective filter. A mixer is coupled to the low noise amplifier, local oscillator, and a channel filter. A WRAN synchronization demodulator decoder is coupled to the channel filter.

In yet another aspect of the invention, a WRAN CPE RF system includes an out-of-band sensing circuit capable of opportunistic out-band spectrum sensing and a WRAN signal receiving circuit capable of performing WRAN signal receiving in parallel with data transmission.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE ILLUSTRATED EMBODIMENTS

Embodiments of the invention generally provide a RF architecture for CPE for use in, for example, IEEE 802.22 WRANs. In some embodiments, the CPE RF architecture includes two receive chains with a directional antenna and an omni-directional antenna, respectively. The CPE RF architecture facilitates opportunistic out-of-band spectrum sensing and WRAN signal receiving that are performed in parallel with data transmission.

In a particular embodiment, the present disclosure provides a WRAN CPE RF architecture. The WRAN CPE RF architecture includes an out-of-band sensing circuit and a WRAN signal receiving circuit coupled to the out-of-band sensing circuit.

Reference will now be made in detail to an embodiment of the present invention, an example of which is illustrated in the accompanying drawings.

Figure 1:
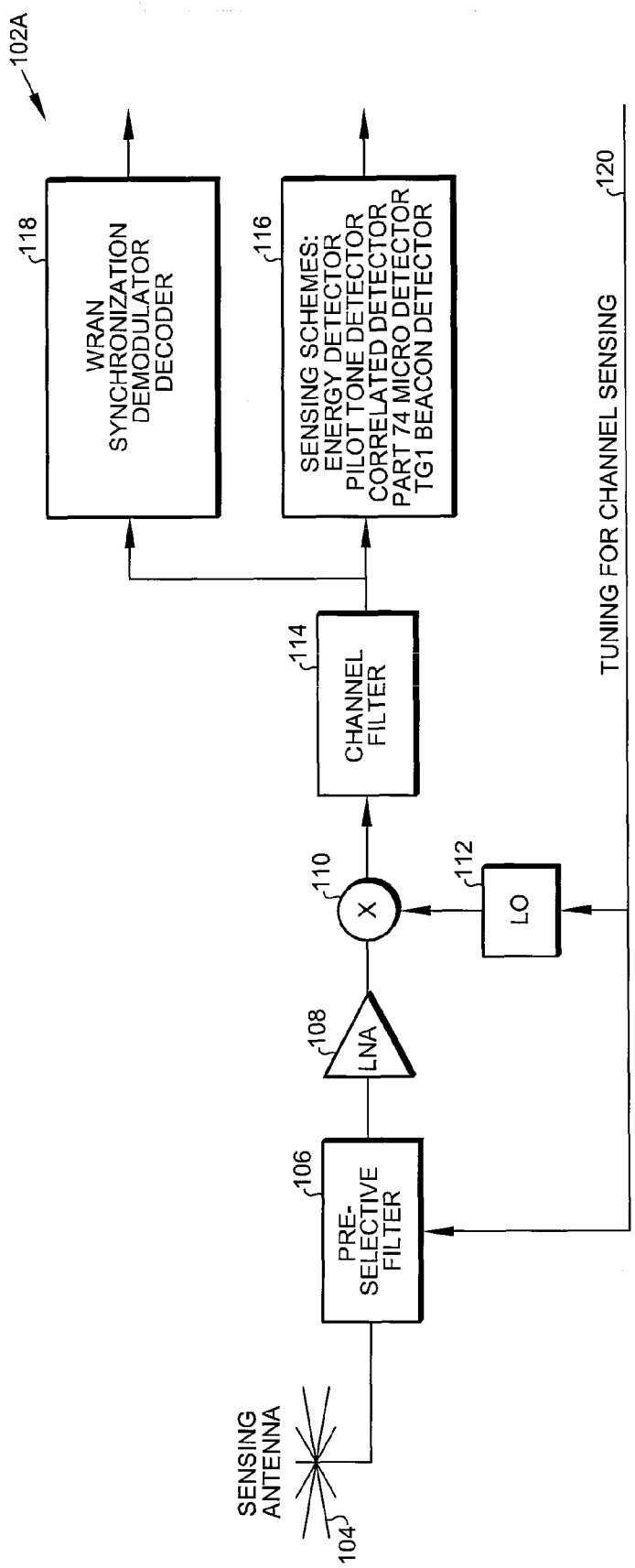
FIG. 1 is a simplified block diagram of a WRAN CPE RF architecture according to one embodiment of the invention.

FIG. 1 is a simplified block diagram of a WRAN CPE RF architecture according to one embodiment of the invention. In this example, the WRAN CPE RF architecture includes an out-of-band sensing circuit 102a. In some embodiments, the out-of-band sensing circuit 102a includes a sensing antenna 104 coupled to a pre-selective filter 106. The pre-selective filter 106 is coupled to a low noise amplifier (LNA) 108. The LNA 108 is coupled to a mixer 110. The mixer 110 is coupled to a local oscillator (LO) 112 and a channel filter 114. The channel filter 114 is coupled to both a sensing scheme module 116 and a WRAN synchronization demodulator decoder 118. The out-of-band sensing circuit 102a also includes a tuning signal 120 for tuning channel sensing.

The sensing scheme module 116 performs a sensing scheme, e.g., sensing function. The sensing function observes the RF spectrum of channels, e.g., television channels, for a set of signal types and reports the results of this observation. The spectrum sensing function may be implemented in both the BS and CPEs. A management frame, e.g., medium access control (MAC) management frame may allow the BS to control operation of the spectrum sensing function within each CPE.

The spectrum sensing function may be performed on any signal type from a variety of different devices. By way of example, the signals may be received from an energy detector, a pilot tone detector, a correlated detector, a Part 44 micro-detector, TGI beacon detector, IEEE 802.22 WRAN, IEEE 802.22.1 Sync Burst, IEEE 802.22.1 PPDU, television channels, e.g., ATSC, NTSC, and DVB-T.

The WRAN synchronization demodulator decoder 118 allows the system to receive outside data from another system, e.g., other BSs and CPEs not subscribed, while transmission/reception on another directional antenna can take place to a BS to which the CPE has subscribed. More specifically, the receiver can listen to other WRAN 802.22 systems. For example, there may be a coexistence beacon protocol (CBP) that requires one WRAN's CPEs to listen to and report information from a neighboring WRAN's BS and CPEs. Therefore, in embodiments of the invention, there are two receive paths and at least two turners, so that the reception of CBP frames from neighboring WRANs can be received while normal transmission/reception on the directional antenna can take place.

Figure 2:
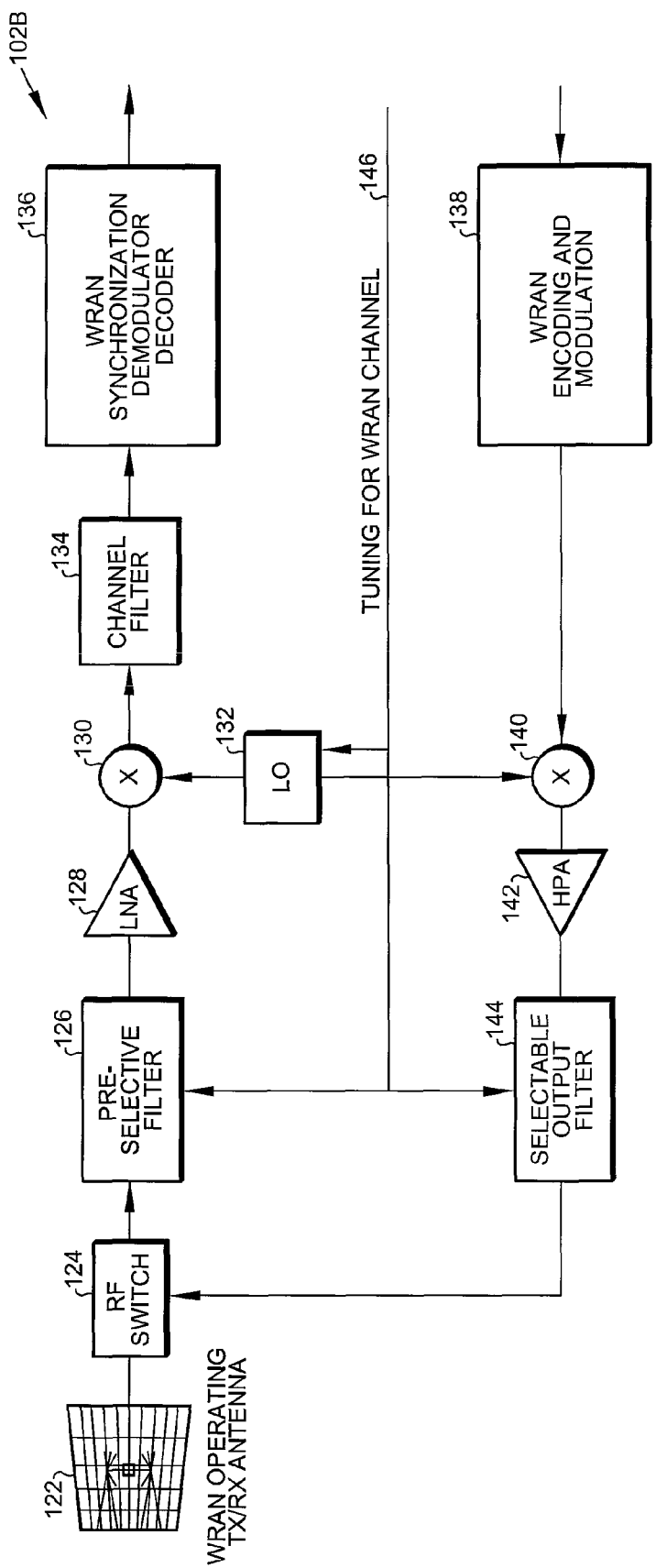
FIG. 2 is another simplified block diagram of a WRAN CPE RF architecture according to one embodiment of the invention.

Referring now to FIG. 2, in some embodiments, the WRAN signal receiving circuit 102b includes, for example, a demodulation circuit and a modulation circuit. The demodulation circuit may include a directional WRAN operating transceiver (TX/RX) antenna 122. The WRAN operating transceiver antenna 122 is coupled to a RF switch 124, which in turn is coupled to a pre-selective filter 126. The pre-selective filter 126 is coupled to a LNA 128, which in turn is coupled to a mixer 130. The mixer 130 is coupled to a LO 132 and a channel filter 134. The channel filter 134 is coupled to a WRAN synchronization demodulator decoder 136.

The modulation circuit of the WRAN signal receiving circuit 102b could include a WRAN encoding and modulation block 138 coupled to a mixer 140. The mixer 140 is coupled to the LO 132 and a high power amplifier (HPA) 142. The HPA 142 is coupled to a selectable output filter 144, which in turn is coupled to the RF switch 124 described earlier. The WRAN signal receiving circuit 102b also includes a tuning signal 146 for tuning the WRAN channel.

Accordingly, the WRAN CPE RF architecture includes two receive chains with a directional antenna and an omni-directional antenna. The WRAN CPE RF architecture facilitates opportunistic out-of-band spectrum sensing and WRAN signal receiving that are performed in parallel with data transmission.

More specifically, in some embodiments, the WRAN CPE RF architecture allows off-channel spectrum detection, including spectrum sensing and receiving of signals from other licensed exempt systems (such as other WRAN signals), while the WRAN CPE is synchronized with its BS and receives data. In other words, the WRAN CPE RF architecture provides two independent tuning circuits.

In some embodiments, the WRAN CPE RF architecture allows off-channel spectrum detection while the WRAN CPE transmits if there is sufficient isolation between the two antennas. This may be unlikely at the CPE (although it need not be), and it could also be possible at the BS.

In some embodiments, the WRAN CPE RF architecture uses different sampling frequencies for the analog/digital (A/D) conversion on the operational path, and the spectrum detection path may need to be different.

The WRAN CPE RF architecture, in some embodiments provides an optimized RF path for WRAN operation and spectrum detection.

In some embodiments, the WRAN CPE RF architecture allows for independent tuning of the operation RF path and the spectrum detection path.

In addition, the WRAN CPE RF architecture provides separate WRAN demodulation and spectrum detection circuits.

In some embodiments, the WRAN CPE RF architecture allows for better optimization of the CPE RF characteristics and of the WRAN system operating characteristics (i.e., minimize quiet periods). In some embodiments, the WRAN CPE RF architecture also allows for consistent automatic gain control (AGC) tracking and synchronization/acquisition in both RF paths. Furthermore, embodiments of the invention may be capable of supporting several modes of transmission including, for example, the CBP.

Accordingly, embodiments of the invention may provide an additional demodulator so that the CPE can receive data along the WRAN signal receiving circuit 102b using a directional antenna (such as the WRAN operating transceiver antenna 122), which is tuned to the BS's channel. Thus, the out-of-band sensing circuit 102a is used to sense transmitters on other channels with the omni-directional antenna path (such as the WRAN signal receiving circuit 102b). If another WRAN system is detected, the WRAN CPE RF architecture can decode the other system's transmission. In one embodiment, there are therefore none of the impairments on the RF side (such as adjusting the automatic gain control, etc.) generally found in conventional systems and methods.

The WRAN CPE RF architecture thus may also allow the CPE to receive and decode (beyond just sensing) the CPE frames from neighboring systems, while the CPE can continue to communicate (i.e., receive and transmit) on the channel that its BS uses.

In some embodiments, various functions described above can be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of media.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure as defined by the following claims.

What is claimed is:

1. A coordinated pair of circuits in a Consumer Premise Equipment (CPE) in a Wireless Regional Area Network (WRAN) comprising an out-of-band sensing circuit, and a transmitting and receiving circuit,
wherein the out-of-band sensing circuit comprises:
   an omnidirectional sensing antenna;
   a first tunable pre-selective filter coupled to the omnidirectional sensing antenna;
   a first low noise amplifier coupled to the first tunable pre-selective filter;
   a first mixer coupled to the low noise amplifier;
   a first tunable local oscillator coupled to the first mixer;
   a first channel filter coupled to the first mixer;
   a first WRAN synchronization demodulator module coupled to the first channel filter; and
   a sensing scheme module coupled to the first channel filter,
   wherein the first tunable pre-selective filter and the first tunable local oscillator receive a first common tuning signal, and
   wherein the first WRAN synchronization demodulator module is configured to ignore in-band signals but detect other, out-of-band, WRAN signals, either from other WRAN base stations, television channels, or from other Consumer Premise Equipment;
wherein the transmitting and receiving circuit comprises:
   a directional antenna operable both as a transmitter and a receiver;
   a radio frequency (RF) switch coupled to the directional antenna;
   an in-band demodulation circuit coupled to the RF switch;
   an in-band modulation circuit coupled to the RF switch; and
   wherein the out-of-band sensing circuit can operate at the same time that normal transmission and reception occurs on the transmitting and receiving circuit between the CPE and the base station to which the CPE is subscribed.

2. The coordinated pair of circuits of claim 1, wherein the sensing scheme module is capable of performing spectrum sensing using a variety of different devices, including at least one of an energy detector, a picture detector, a correlated detector, a part 74 detector, a TG1 Beacon detector.

3. The coordinated pair of circuits of claim 1, wherein the in-band demodulation circuit comprises:
   a second tunable pre-selective filter coupled to the RF switch;
   a second low noise amplifier coupled to the second tunable pre-selective filter;
   a second mixer coupled to the second low noise amplifier;
   a second tunable local oscillator coupled to the second mixer;
   a second channel filter coupled to the second mixer; and
   a second WRAN synchronization demodulator module coupled to the second channel filter,
   wherein the second pre-selective filter and the second local oscillator receive a second common tuning signal.

4. The coordinated pair of circuits of claim 3, wherein the in-band modulation circuit comprises:
   a WRAN encoding and modulation block;
   a third mixer coupled to the WRAN encoding and modulation block and coupled to the second tunable local oscillator;
   a high power amplifier (HPA) coupled to the third mixer; and
   a tunable selectable output filter coupled to the HPA and the second tunable pre-selective filter,
   wherein the selectable output filter receives the second common tuning signal.

5. The coordinated pair of circuits of claim 1, wherein the out-of-band sensing circuit is configured to receive outside data from an unsubscribed base station (BS) or consumer premise equipment (CPE).

6. A wireless regional area network (WRAN) consumer premise equipment (CPE) radio frequency (RF) system, comprising:
   first, an out-of-band sensing circuit capable of out-band spectrum sensing comprising:
   an omnidirectional sensing antenna;
   a first tunable pre-selective filter coupled to the omnidirectional sensing antenna;
   a first low noise amplifier coupled to the first tunable pre-selective filter;
   a first mixer coupled to the low noise amplifier;
   a first tunable local oscillator coupled to the mixer;
   a first channel filter coupled to the mixer;
   a first WRAN synchronization demodulator module coupled to the first channel filter; and
   a sensing scheme module coupled to the first channel filter,
   wherein the first tunable pre-selective filter and the first tunable local oscillator receive a first common tuning signal, and wherein
   the first WRAN synchronization demodulator module is configured to ignore in-band signals but detect other, out-of-band, WRAN signals, either from other WRAN base stations, television channels, or from other Consumer Premise Equipment,
   and, second, an in-band WRAN signal transmitting and receiving circuit comprising:
   a directional antenna operable both as a transmitter and a receiver;
   a RF switch coupled to the directional antenna;
   an in-band demodulation circuit coupled to the RF switch;
   an in-band modulation circuit coupled to the RF switch; and
   wherein the out-of-band sensing circuit and the transmitting and receiving circuits are operated to perform, respectively, in parallel, out-band WRAN signal receiving on the omnidirectional antenna, and data transmission and reception on the directional antenna.

7. The system of claim 6, wherein the sensing scheme module is capable of performing spectrum sensing using a variety of different devices including at least one of an energy detector, a picture detector, a correlated detector, a part 74 detector, a TG1 Beacon detector.

8. The system of claim 6, wherein the in-band demodulation circuit comprises:
   a directional antenna;
   a RF switch coupled the antenna;
   a second tunable pre-selective filter coupled to the RF switch;
   a second low noise amplifier coupled to the second tunable pre-selective filter;
   a second mixer coupled to the second low noise amplifier;
   a second tunable local oscillator coupled to the second mixer;
   a second channel filter coupled to the second mixer; and
   a second WRAN synchronization demodulator module coupled to the second channel filter,
   wherein the second pre-selective filter and the second tunable local oscillator receive a second common tuning signal.

9. The system of claim 8, wherein the in-band modulation circuit comprises:
- a WRAN encoding and modulation block;
- a third mixer coupled to the WRAN encoding and modulation block and coupled to the second tunable local oscillator;
- a high power amplifier (HPA) coupled to the third mixer; and
- a tunable selectable output filter coupled to the HPA and the second tunable pre-selective filter.

10. The system of claim 9, wherein the first WRAN synchronization demodulator module is operated to ignore in-band signals but detect other WRAN signals, either from other WRAN base stations, television channels, or from other Consumer Premise Equipment.

11. The system of claim 9, wherein the system is configured so that the out-of-band sensing circuit also decodes a detected WRAN system's transmission.

12. The system of claim 9, wherein the system is configured to receive and decode CPE signals from neighboring systems while communicating on a channel with its base station (BS).

13. The system of claim 8, wherein the data from the directional antenna is to or from a subscribed base station (BS).

* * * * *